(12) United States Patent
Majewski et al.

(10) Patent No.: US 6,681,740 B1
(45) Date of Patent: Jan. 27, 2004

(54) INJECTION CONTROL PRESSURE STRATEGY DURING ACTIVATION OF AN ENGINE RETARDER

(75) Inventors: Michael A. Majewski, Joliet, IL (US); James T. Beaucaire, Glen Ellyn, IL (US)

(73) Assignee: International Engine Intellectual Property Company, LLC, Warrenville, IL (US)

(*) Notice: Subject to any disclaimer, the term of this patent is extended or adjusted under 35 U.S.C. 154(b) by 5 days.

(21) Appl. No.: 10/338,427

(22) Filed: Jan. 8, 2003

(51) Int. Cl.$^7$ ............................... F02D 13/04
(52) U.S. Cl. ............... 123/320; 123/446; 123/323; 123/321
(58) Field of Search ................. 123/320, 321, 123/322, 323, 446, 502

(56) References Cited

U.S. PATENT DOCUMENTS

| | | | | |
|---|---|---|---|---|
| 5,191,867 A | * | 3/1993 | Glassey | 123/446 |
| 5,564,386 A | * | 10/1996 | Korte et al. | 123/321 |
| 5,735,242 A | * | 4/1998 | Kahlenbeck et al. | 123/322 |
| 5,794,590 A | * | 8/1998 | Bergmann | 123/321 |
| 6,283,090 B1 | * | 9/2001 | Harmon | 123/446 |
| 6,405,707 B1 | * | 6/2002 | Feucht | 123/321 |
| 2003/0037765 A1 | * | 2/2003 | Shafer et al. | 123/446 |

* cited by examiner

*Primary Examiner*—Erick Solis
(74) *Attorney, Agent, or Firm*—Dennis Kelly Sullivan; Susan K. Lukasik; Jeffrey P. Calfa

(57) ABSTRACT

A control strategy for mitigation of the effect of increased engine back-pressure on fuel injectors (22) when an engine retarder is activated to slow the engine (10) of a motor vehicle. The strategy attenuates injection control pressure ICP of hydraulic fluid for the fuel injectors to a defined dwell pressure ICP_VRE_DWL, and once that dwell pressure has been attained, keeps the injection control pressure from exceeding it for the length of a dwell time ICP_DWL_TM. Upon elapse of the dwell time, the injection control pressure gradually increases above the dwell pressure using a pressure versus time map (54). When engine operating conditions call for greater injection control pressure while the retarder is activated, the strategy provides for greater injection control pressure using a pressure versus speed map (42).

29 Claims, 2 Drawing Sheets

INJECTION CONTROL PRESSURE STRATEGY DURING ACTIVATION OF AN ENGINE RETARDER

FIELD OF THE INVENTION

This invention relates to internal combustion engines for propelling motor vehicles. More specifically it relates to improvements in an engine that is equipped with a mechanism for augmenting back-pressure on the engine, and a retarder that, when activated, operates the mechanism to slow the engine by augmenting the engine back-pressure.

BACKGROUND OF THE INVENTION

A known technique for retarding an internal combustion comprises augmenting engine back-pressure. One way of doing this comprises restricting the exhaust gas flow from the engine. In a conventional camshaft engine, a valve that is disposed in the exhaust system, sometimes called an exhaust brake, can be operated to restrict the exhaust gas flow. In an engine that has variable valve actuation, the individual cylinder exhaust valves may be actuated in a manner that creates the desired restriction.

Certain diesel engines have fuel injection systems that utilize hydraulic fluid under pressure to force fuel into engine combustion chambers. The hydraulic fluid is supplied to a respective fuel injector at each engine cylinder. When a valve mechanism of a fuel injector is operated by an electric signal from an engine control system to inject fuel into the respective cylinder, the hydraulic fluid is allowed to act on a piston in the fuel injector to force a charge of fuel into the respective combustion chamber.

SUMMARY OF THE INVENTION

The present invention arises through the recognition that retarding an engine by augmenting exhaust back-pressure inherently creates back forces on the fuel injectors that may cause undesirably high impact loads on the fuel injectors. Over time, the cumulative effect of repeated impacts may accelerate wear and have adverse consequences on performance and durability.

The present invention is directed toward a solution for avoiding such consequences by employing a novel strategy in the engine control system to attenuate the injection control pressure to the fuel injectors in a way that mitigates the effect of augmented back-pressure on the fueling system when the engine retarder is activated to retard the engine. Upon activation of the engine retarder, the strategy attenuates injection control pressure to a defined dwell pressure. Once that dwell pressure has been attained, the strategy keeps the injection control pressure from exceeding the defined dwell pressure. Upon elapse of a dwell time during which the injection control pressure has not exceeded the defined dwell pressure, the strategy increases the hydraulic fluid pressure above the defined dwell pressure.

A timing function sets a predetermined time for the dwell time. During the dwell time, the strategy conditions continued maintenance of the defined dwell pressure upon engine speed not exceeding a speed that, according to a pressure versus speed map, would call for hydraulic fluid pressure to be greater than the defined dwell pressure. Should engine speed begin to exceed a speed that, according to the pressure versus speed map, would call for injection control pressure to be greater than the defined dwell pressure, the strategy discontinues maintenance of the defined dwell pressure and instead increases hydraulic fluid pressure in accordance with the pressure versus speed map.

Upon elapse of the defined dwell time, the strategy increases the injection control pressure as a function of time in accordance with a map of pressure versus time. It also conditions continuation of increasing of the hydraulic fluid pressure in accordance with the pressure versus time map on engine speed not exceeding a speed that, according to the pressure versus speed map, would call for hydraulic fluid pressure to be greater than the hydraulic fluid pressure called for by the pressure versus time map. Should engine speed begin to exceed a speed that, according to the pressure versus speed map, would call for hydraulic fluid pressure to be greater than the hydraulic fluid pressure called for by the pressure versus time map, the strategy discontinues continued increasing of the hydraulic fluid pressure in accordance with the pressure versus time map and instead increases hydraulic fluid pressure in accordance with the pressure versus speed map.

Accordingly, one generic aspect of the present invention relates to an internal combustion engine comprising a fueling system that utilizes hydraulic fluid under pressure to force fuel into engine combustion chambers, an engine control system for controlling various aspects of engine operation including controlling pressure of the hydraulic fluid, and a mechanism for augmenting back-pressure on the engine in response to a command from the engine control system to retard the engine.

In consequence of issuance of the command to retard the engine, the engine control system attenuates the hydraulic fluid pressure to mitigate the effect of augmented back-pressure on the fueling system. Once the hydraulic fluid pressure has been attenuated to a defined dwell pressure, the control system keeps the hydraulic fluid pressure from exceeding the defined dwell pressure. Upon elapse of a dwell time during which the hydraulic fluid pressure has not exceeded the defined dwell pressure, the control system increases the hydraulic fluid pressure above the defined dwell pressure.

Another generic aspect relates to an internal combustion engine comprising a fueling system that utilizes hydraulic fluid under pressure to force fuel into engine combustion chambers, an engine control system for controlling various aspects of engine operation including controlling pressure of the hydraulic fluid, and a mechanism for augmenting back-pressure on the engine in response to a command from the engine control system to retard the engine.

The control system comprises a selector for selecting control of hydraulic fluid pressure from a selected one of plural sources of hydraulic fluid pressure control to the exclusion of other sources of hydraulic fluid pressure control. The one source is selected by a command given in conjunction with the command for the mechanism to retard the engine. In consequence of its selection, the one source controls hydraulic fluid pressure such that the hydraulic fluid pressure is attenuated to, and then kept from exceeding, a defined dwell pressure. After elapse of a dwell time defined by an amount of time during which the actual hydraulic fluid pressure has not exceeded the defined dwell pressure, the one source increases the hydraulic fluid pressure above the defined dwell pressure.

Still another generic aspect relates to a control system for an internal combustion engine comprising a processor for processing various data to develop data for control of various engine functions, including control of hydraulic fluid pressure used by a fueling system to force fuel into engine combustion chambers. Upon the processor developing data calling for actuation of a mechanism for augmenting back-pressure on the engine to retard the engine, the processor executes an algorithm for mitigating the effect of augmented back-pressure on the fueling system by developing data for causing the hydraulic fluid pressure to be attenuated to, and then kept from exceeding, a defined dwell pressure, and after elapse of a dwell time defined an amount of time during which the hydraulic fluid pressure has not exceeded the defined dwell pressure, developing data for causing the hydraulic fluid pressure to increase above the defined dwell pressure.

Still another generic aspect relates to a method for mitigating the effect of augmented back-pressure on an internal combustion engine fueling system that utilizes hydraulic fluid under pressure to force fuel into engine combustion chambers when a mechanism is operated to augment back-pressure on the engine in response to a command from an engine control system to retard the engine. In consequence of issuance of the command to retard the engine, the hydraulic fluid pressure is attenuated to mitigate the effect of augmented back-pressure on the fueling system. Once the hydraulic fluid pressure has been attenuated to a defined dwell pressure, the hydraulic fluid pressure is kept from exceeding the defined dwell pressure. Upon elapse of a dwell time during which the hydraulic fluid pressure has not exceeded the defined dwell pressure, the hydraulic fluid pressure is increased above the defined dwell pressure.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
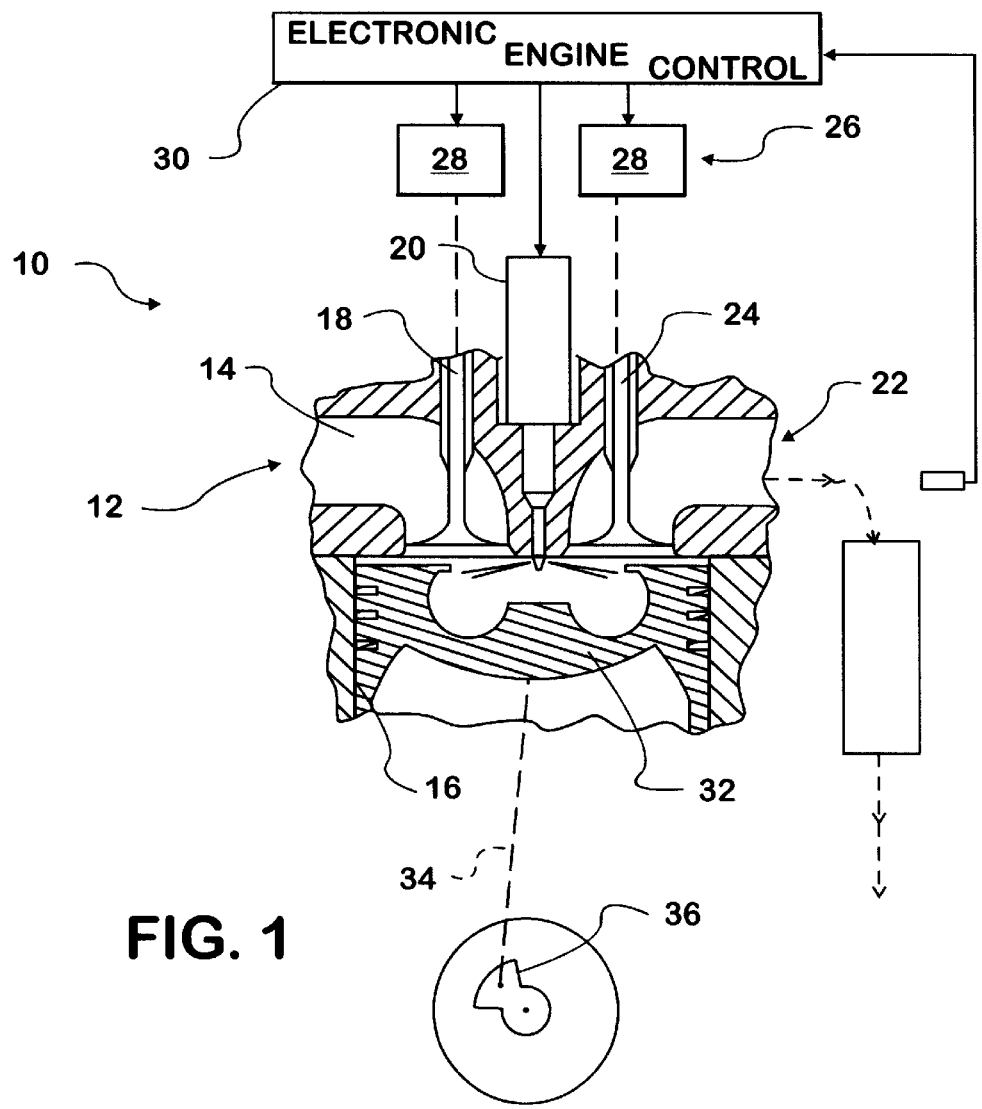
FIG. 1 is a general schematic diagram of an exemplary internal combustion engine in accordance with principles of the present invention.

FIG. 1 shows an exemplary internal combustion engine 10 having an intake system 12 through which air for combustion enters the engine and an exhaust system 14 through which exhaust gas resulting from combustion exits the engine. Engine 10 is, by way of example, a diesel engine that may comprise a turbocharger (not specifically shown in the drawing). When used in a motor vehicle, such as a truck, engine 10 is coupled through a drivetrain 16 to driven wheels 18 propel the vehicle.

Engine 10 comprises cylinders 20 forming combustion chambers into which fuel is injected by fuel injectors 22 to form a mixture with air that has entered through intake system 12. The mixture combusts under pressure to power the engine, and hence propel the vehicle. Gas resulting from combustion is exhausted through exhaust system 14.

Fuel injectors 22 are under the control of an engine control system 24 that comprises one or more processors that process various data to develop data for controlling various aspects of engine operation including controlling pressure of hydraulic fluid 26 supplied to fuel injectors 22 and the timing of operation of valve mechanisms in the fuel injectors. Engine 10 comprises a hydraulic system 28 that provides hydraulic fluid 26 and that controls the hydraulic fluid pressure, which is also sometimes known as injection control pressure.

When a valve mechanism of a fuel injector 22 is operated by an electric signal from engine control system 24 to inject fuel into the respective cylinder, the hydraulic fluid 26 is enabled to act on a piston in the fuel injector to force a charge of fuel into the respective combustion chamber. Fuel injectors of this general type are disclosed in various prior patents.

Figure 2:
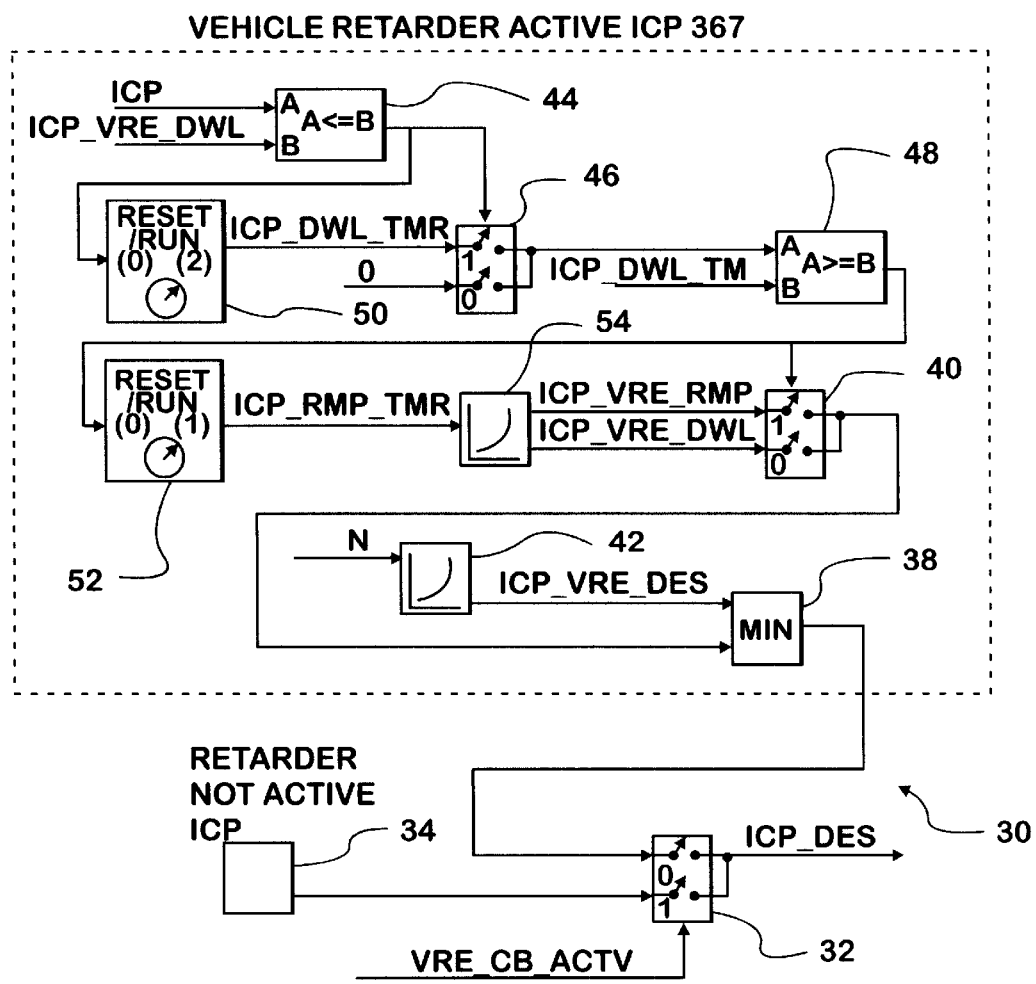
FIG. 2 is a schematic diagram of a portion of an engine control strategy pertinent to the present invention.

Principles of the inventive strategy 30 are disclosed in FIG. 2. The strategy is part of the overall engine control strategy and implemented by an algorithm that is repeatedly executed by a processor, or processors, of engine control system 24. The portion of the overall strategy shown in FIG. 2 comprises a switch function 32 for selecting a data value for desired injection control pressure from a selected one of plural sources to the exclusion of others, there being just two such sources in the example presented here.

A data value ICP_DES represents a desired injection control pressure, and it should be noted that control system 24 processes ICP_DES in accordance with further processing, but that further processing is not shown in FIG. 2 because it does not bear on principles of the present invention. In general, that further processing deals with control techniques for securing fast and faithful response of injection control pressure to the desired injection control pressure.

Switch function 32 is controlled by a data signal VRE_CB_ACTV to cause a data value for ICP_DES to be selected from a source 34 whenever retarding of engine 10 by increasing engine back-pressure is not being called for by the control strategy. In general, source 34 sets desired injection control pressure according one or more maps that use engine fueling and engine speed as inputs. A particular one of several maps may be used depending on factors such as engine temperature and barometric pressure, and/or a map that is used may be compensated by such factors.

Whenever retarding of engine 10 by increasing engine back-pressure is being called for by the control strategy, switch function 32 selects a data value for ICP_DES from a source 36, named Vehicle Retarder Active ICP in the drawing Figure. Principles of the invention particularly concern Vehicle Retarder Active ICP source 36.

One way of retarding the motion of a vehicle that is being propelled by engine 10 is to augment the exhaust back-pressure in one of the ways described earlier. A command to retard the vehicle may therefore be effective to restrict the exhaust gas flow and thereby increase back-pressure on the engine. Such a command will be accompanied by switch function 32 changing its selection for ICP_DES from source 34 to source 36.

When source 36 is being selected, a data value for ICP_DES is determined by a minimum selection function 38 to be the smaller of two data values, ICP_VRE_DES and whichever one of two data values IC_VRE_RMP and ICP_VRE_DWL is being selected by a switch function 40. A data value for ICP_VRE_DES is derived from a pressure versus speed map 42 which will be more fully discussed later.

A data value ICP represents actual injection control pressure, as obtained from a suitable data source associated with the engine and control system, and forms one data input for source 36. A second data input is the parameter ICP_VRE_DWL, a calibratable parameter. The data value for ICP_VRE_DWL represents an injection control pressure that has been deemed appropriate for the fuel system during a dwell time that ensues upon source 36 becoming selected by switch function 32. ICP_VRE_DWL is also sometimes called desired dwell pressure, or defined dwell pressure.

Retarding engine 10 implies that the engine has been running at a relatively higher speed, and consequently that retarding the engine will reduce engine speed, likely in a significant amount. Hence, immediately prior to incipient retarding of engine 10, it is expected that injection control pressure will be higher, likely significantly higher, than the pressure corresponding to the data value for ICP_VRE_DWL. Therefore at the onset of retarding, it is expected that engine speed will be high enough that a corresponding pressure from map 42 will be larger than the data value for ICP_VRE_DWL, and as a consequence, minimum selection function 38 will be providing the data value for desired, or defined, dwell pressure ICP_VRE_DWL as the desired injection control pressure. This condition occurs because of the effect of a comparison function 44 that compares the data value for actual injection control pressure ICP and the data value for desired dwell pressure ICP_VRE_DWL. So long as the actual injection control pressure exceeds the desired dwell pressure, as it is expected to at incipient engine retarding, function 44 causes a switch function 46 to select a "0" input as one of two inputs to another comparison function 48 that in turn controls switch function 40. The selection of a "0" input to comparison function 48 by switch function 46 will cause switch function 40 to select the data value for ICP_VRE_DWL for processing by function 38. This is because function 48 compares the "0" input with the data value of a parameter ICP_DWL_TM representing a desired dwell time, or defined dwell time, and that latter data value is selected to be a positive one.

The reduction in the data value for desired injection control pressure ICP_DES due to the onset of engine retarding therefore begins reducing the actual injection control pressure toward to the desired dwell pressure. This attenuation in the pressure of the hydraulic fluid that is being supplied to the fuel injectors serves to mitigate the effect of increased engine back-pressure on the fuel system.

The desired, or defined, dwell time is also a calibratable parameter. Upon elapse of the desired dwell time, during which desired dwell pressure had been selected as desired injection control pressure ICP, switch function 40 switches from selecting the data value for ICP_VRE_DWL as the data value for desired injection control pressure ICP_DES to selecting the data value for ICP_VRE_RMP as the data value to be processed by minimum selection function 38.

Desired dwell time is measured by a timer function 50 that begins running once comparison function 44 has disclosed that actual injection control pressure has diminished to a value at least as low as the desired dwell pressure. Although switch function 46 selects the timer parameter ICP_DWL_TMR instead of a "0" upon comparison function 44 disclosing that actual injection control pressure has diminished to a value at least as low as the desired dwell pressure, comparison function 48 will keep switch function 40 selecting the desired dwell pressure ICP_VRE_DWL until the desired dwell time has elapsed.

Once desired dwell time has elapsed, function 48 starts a secondtimer function 52 that provides an input to a pressure versus time map 54. Function 48 also causes switch function 40 to change its selection from the data value for ICP_VRE_DWL to the data value for ICP_VRE_RMP. Consequently, injection control pressure values from map 54 now are furnished to minimum selection function 38. In general, the values from map 54 increase with time so that the effect is to gradually increase the data value for desired injection control pressure ICP after the pressure has dwelled at the desired dwell pressure for the desired dwell time.

During the time that source 36 is being selected by switch function 32, it is possible that engine operation may change in a way that calls for injection control pressure to be greater than that called for by the data value being selected by switch function 40. Map 42 addresses such a possibility by providing pressure values correlated with engine speed. After the desired dwell time has elapsed, an engine speed that begins to exceed a speed that, according to map 42, would call for hydraulic fluid pressure to be greater than the hydraulic fluid pressure called for by whichever one of its two inputs switch function 40 is selecting, results in minimum selection function 38 selecting desired injection control pressure in accordance with the pressure versus speed map 42. Map 42 may therefore override ICP_VRE_DWL during the dwell time, and also map 54 after the dwell time. Stated another way, maintenance of the desired dwell pressure during the desired dwell time is conditioned on engine speed not exceeding a speed that, according to map 42, would call for hydraulic fluid pressure to be greater than the defined dwell pressure, and if that is not the case, then map 42 is used to set desired injection control pressure. Similarly, continued use of map 54 after the dwell time is conditioned on engine speed not exceeding a speed that, according to map 42, would call for hydraulic fluid pressure to be greater than the pressure called for by map 54, and if that is not the case, then map 42 is used to set desired injection control pressure.

Anytime that injection control pressure exceeds desired dwell pressure, timer function 50 is reset, and the resetting of that function also serves to reset timer function 48.

The foregoing description has shown that upon activation of the engine retarder, the retarding of the engine will retard the vehicle. The disclosed basic strategy attenuates injection control pressure to a defined dwell pressure, and once that dwell pressure has been attained, keeps the injection control pressure from exceeding it for the length of a dwell time. Upon elapse of the dwell time, the hydraulic fluid pressure gradually increases above the dwell pressure. The inventive strategy further includes measures for overriding the basic strategy when engine operating conditions call for greater injection control pressure than that provided by the basic strategy.

While a presently preferred embodiment of the invention has been ed and described, it should be appreciated that principles of the invention all embodiments falling within the scope of the following claims.

What is claimed is:

1. An internal combustion engine comprising:
    a fueling system that utilizes hydraulic fluid under pressure to force fuel into engine combustion chambers;
    an engine control system for controlling various aspects of engine operation including controlling pressure of the hydraulic fluid; and
    a mechanism for augmenting back-pressure on the engine in response to a command from the engine control system to retard the engine; wherein in consequence of issuance of the command to retard the engine,
    the engine control system attenuates the hydraulic fluid pressure to mitigate the effect of augmented back-pressure on the fueling system,
    once the hydraulic fluid pressure has been attenuated to a defined dwell pressure, the control system keeps the hydraulic fluid pressure from exceeding the defined dwell pressure, and upon elapse of a dwell time during which the hydraulic fluid pressure has not exceeded the defined dwell pressure, the control system increases the hydraulic fluid pressure above the defined dwell pressure.

2. An internal combustion engine as set forth in claim 1 wherein upon elapse of the dwell time, the control system increases the hydraulic fluid pressure as a function of time in accordance with a map of pressure versus time.

3. An internal combustion engine as set forth in claim 2 wherein the control system comprises a timing function that sets a predetermined time for the dwell time.

4. An internal combustion engine as set forth in claim 3 wherein upon elapse of the dwell time, the control system conditions continuation of increasing of the hydraulic fluid pressure in accordance with the pressure versus time map on engine speed not exceeding a speed that, according to a pressure versus speed map, would call for hydraulic fluid pressure to be greater than the hydraulic fluid pressure called for by the pressure versus time map.

5. An internal combustion engine as set forth in claim 4 wherein once the control system has conditioned the continuation of increasing of the hydraulic fluid pressure, the control system discontinues continued increasing of the hydraulic fluid pressure in accordance with the pressure versus time map when engine speed begins to exceed a speed that, according to the pressure versus speed map, would call for hydraulic fluid pressure to be greater than the hydraulic fluid pressure called for by the pressure versus time map, and instead increases hydraulic fluid pressure in accordance with the pressure versus speed map.

6. An internal combustion engine as set forth in claim 3 wherein during the dwell time, the control system conditions continued maintenance of the defined dwell pressure upon engine speed not exceeding a speed that, according to a pressure versus speed map, would call for hydraulic fluid pressure to be greater than the defined dwell pressure.

7. An internal combustion engine as set forth in claim 6 wherein during the dwell time, the control system discontinues maintenance of the defined dwell pressure when engine speed begins to exceed a speed that, according to the pressure versus speed map, would call for hydraulic fluid pressure to be greater than the defined dwell pressure and instead increases hydraulic fluid pressure in accordance with the pressure versus speed map.

8. An internal combustion engine as set forth in claim 1 including a motor vehicle comprising a drivetrain through which the engine is coupled with driven wheels for propelling the vehicle, and wherein issuance of the command to retard the engine is effective to cause the engine to slow the vehicle.

9. An internal combustion engine comprising:
a fueling system that utilizes hydraulic fluid under pressure to force fuel into engine combustion chambers;
an engine control system for controlling various aspects of engine operation including controlling pressure of the hydraulic fluid; and
a mechanism for augmenting back-pressure on the engine in response to a command from the engine control system to retard the engine; wherein
the control system comprises a selector for selecting control of hydraulic fluid pressure from a selected one of plural sources of hydraulic fluid pressure control to the exclusion of other sources of hydraulic fluid pressure control,
the one source is selected by a command given in conjunction with the command for the mechanism to retard the engine,
and in consequence of its selection, the one source controls hydraulic fluid pressure such that the hydraulic fluid pressure is attenuated to, and then kept from exceeding, a defined dwell pressure, and after elapse of a dwell time defined by an amount of time during which the actual hydraulic fluid pressure has not exceeded the defined dwell pressure, the one source increases the hydraulic fluid pressure above the defined dwell pressure.

10. An internal combustion engine as set forth in claim 9 wherein after elapse of the dwell time, the one source increases the hydraulic fluid pressure as a function of time in accordance with a pressure versus time map.

11. An internal combustion engine as set forth in claim 10 wherein upon elapse of the dwell time, the one source conditions continuation of increasing of the hydraulic fluid pressure in accordance with the pressure versus time map on engine speed not exceeding a speed that, according to a pressure versus speed map, would call for hydraulic fluid pressure to be greater than the hydraulic fluid pressure called for by the pressure versus time map.

12. An internal combustion engine as set forth in claim 11 wherein once the one source has conditioned the continuation of increasing of the hydraulic fluid pressure, the one source discontinues continued increasing of the hydraulic fluid pressure in accordance with the pressure versus time map when engine speed begins to exceed a speed that, according to the pressure versus speed map, would call for hydraulic fluid pressure to be greater than the hydraulic fluid pressure called for by the pressure versus time map, and instead increases hydraulic fluid pressure in accordance with the pressure versus speed map.

13. An internal combustion engine as set forth in claim 9 wherein during the dwell time, the one source conditions continued maintenance of the defined dwell pressure upon engine speed not exceeding a speed that, according to a pressure versus speed map, would call for hydraulic fluid pressure to be greater than the defined dwell pressure.

14. An internal combustion engine as set forth in claim 13 wherein during the dwell time, the one source discontinues maintenance of the defined dwell pressure when engine speed begins to exceed a speed that, according to the pressure versus speed map, would call for hydraulic fluid pressure to be greater than the defined dwell pressure and instead increases hydraulic fluid pressure in accordance with the pressure versus speed map.

15. An internal combustion engine as set forth in claim 9 including a motor vehicle comprising a drivetrain through which the engine is coupled with driven wheels for propelling the vehicle, and wherein issuance of the command to retard the engine is effective to cause the engine to slow the vehicle.

16. A control system for an internal combustion engine comprising:
a processor for processing various data to develop data for control of various engine functions, including control of hydraulic fluid pressure used by a fueling system to force fuel into engine combustion chambers;
wherein, upon the processor developing data calling for actuation of a mechanism for augmenting back-pressure on the engine to retard the engine, the processor executes an algorithm for mitigating the effect of augmented back-pressure on the fueling system by developing data for causing the hydraulic fluid pressure to be attenuated to, and then kept from exceeding, a defined dwell pressure, and after elapse of a dwell time defined an amount of time during which the hydraulic fluid pressure has not exceeded the defined dwell pressure, developing data for causing the hydraulic fluid pressure to increase above the defined dwell pressure.

17. A control system as set forth in claim 16 wherein upon elapse of the dwell time, the algorithm develops data for causing the hydraulic fluid pressure to increase above the defined dwell pressure as a function of time according to a map of pressure versus time.

18. A control system as set forth in claim 17 wherein the algorithm executes a timing function that sets a predetermined time for the dwell time.

19. A control system as set forth in claim 18 wherein upon elapse of the dwell time, the algorithm operates to condition continuation of increasing of the hydraulic fluid pressure in accordance with the pressure versus time map on engine speed not exceeding a speed that, according to a pressure versus speed map, would call for hydraulic fluid pressure to be greater than the hydraulic fluid pressure called for by the pressure versus time map.

20. A control system as set forth in claim 19 wherein once the algorithm has conditioned the continuation of increasing of the hydraulic fluid pressure, the algorithm operates to discontinue continued increasing of the hydraulic fluid pressure in accordance with the pressure versus time map when engine speed begins to exceed a speed that, according to the pressure versus speed map, would call for hydraulic fluid pressure to be greater than the hydraulic fluid pressure called for by the pressure versus time map, and instead operates to increase hydraulic fluid pressure in accordance with the pressure versus speed map.

21. A control system as set forth in claim 18 wherein during the dwell time, the algorithm conditions continued maintenance of the defined dwell pressure upon engine speed not exceeding a speed that, according to a pressure versus speed map, would call for hydraulic fluid pressure to be greater than the defined dwell pressure.

22. A control system as set forth in claim 21 wherein during the dwell time, the algorithm operates to discontinue maintenance of the defined dwell pressure when engine speed begins to exceed a speed that, according to the pressure versus speed map, would call for hydraulic fluid pressure to be greater than the defined dwell pressure and instead operates to increase hydraulic fluid pressure in accordance with the pressure versus speed map.

23. A method for mitigating the effect of augmented back-pressure on an internal combustion engine fueling system that utilizes hydraulic fluid under pressure to force fuel into engine combustion chambers when a mechanism is operated to augment back-pressure on the engine in response to a command from an engine control system to retard the engine, the method comprising:

in consequence of issuance of the command to retard the engine, attenuating the hydraulic fluid pressure to mitigate the effect of augmented back-pressure on the fueling system;

once the hydraulic fluid pressure has been attenuated to a defined dwell pressure, keeping the hydraulic fluid pressure from exceeding the defined dwell pressure; and upon elapse of a dwell time during which the hydraulic fluid pressure has not exceeded the defined dwell pressure, increasing the hydraulic fluid pressure above the defined dwell pressure.

24. A method as set forth in claim 23 wherein upon elapse of the dwell time, increasing the hydraulic fluid pressure as a function of time in accordance with a map of pressure versus time.

25. A method as set forth in claim 24 including executing a timing function that sets a predetermined time for the dwell time.

26. A method as set forth in claim 25 wherein upon elapse of the dwell time, conditioning continuation of increasing of the hydraulic fluid pressure in accordance with the pressure versus time map on engine speed not exceeding a speed that, according to a pressure versus speed map, would call for hydraulic fluid pressure to be greater than the hydraulic fluid pressure called for by the pressure versus time map.

27. A method as set forth in claim 26 wherein once the control system has conditioned the continuation of increasing of the hydraulic fluid pressure, discontinuing continued increasing of the hydraulic fluid pressure in accordance with the pressure versus time map when engine speed begins to exceed a speed that, according to the pressure versus speed map, would call for hydraulic fluid pressure to be greater than the hydraulic fluid pressure called for by the pressure versus time map, and instead increasing hydraulic fluid pressure in accordance with the pressure versus speed map.

28. A method as set forth in claim 25 wherein during the dwell time, conditioning continued maintenance of the defined dwell pressure upon engine speed not exceeding a speed that, according to a pressure versus speed map, would call for hydraulic fluid pressure to be greater than the defined dwell pressure.

29. A method as set forth in claim 28 wherein during the dwell time, discontinuing maintenance of the defined dwell pressure when engine speed begins to exceed a speed that, according to the pressure versus speed map, would call for hydraulic fluid pressure to be greater than the defined dwell pressure and instead increasing hydraulic fluid pressure in accordance with the pressure versus speed map.

* * * * *